(12) United States Patent
Aso

(10) Patent No.: US 7,251,146 B2
(45) Date of Patent: Jul. 31, 2007

(54) DIRECT-CURRENT CONVERTER HAVING ACTIVE CLAMP CIRCUIT

(75) Inventor: Shinji Aso, Niiza (JP)

(73) Assignee: Sanken Electric Co., Ltd. (JP)

( * ) Notice: Subject to any disclaimer, the term of this patent is extended or adjusted under 35 U.S.C. 154(b) by 90 days.

(21) Appl. No.: 10/531,766

(22) PCT Filed: Jun. 1, 2004

(86) PCT No.: PCT/JP2004/007902

§ 371 (c)(1),
(2), (4) Date: Apr. 19, 2005

(87) PCT Pub. No.: WO2005/011094

PCT Pub. Date: Feb. 3, 2005

(65) Prior Publication Data

US 2006/0013021 A1    Jan. 19, 2006

(30) Foreign Application Priority Data

Jul. 24, 2003   (JP) ............................... 2003-279179

(51) Int. Cl.
  *H02M 3/335*   (2006.01)
(52) U.S. Cl. .................................................. 363/21.04
(58) Field of Classification Search ............. 323/21.04, 323/56.12, 56.11; 363/21.04, 56.12, 56.11
See application file for complete search history.

(56) References Cited

U.S. PATENT DOCUMENTS 6,320,765 B2 * 11/2001 Yasumura ................. 363/21.02
6,366,476 B1 * 4/2002 Yasumura ................. 363/21.02

(Continued)

FOREIGN PATENT DOCUMENTS

JP    07-170729 A    7/1995

(Continued)

OTHER PUBLICATIONS

Kosuke Harada, "Suicchingu Dengen Handobukku (Switching Power Supply Handbook)", p. 27, Fig. 2.2, Nikkan Kogyo Shinbun Ltd., 2000.

(Continued)

*Primary Examiner*—Shawn Riley
(74) *Attorney, Agent, or Firm*—Kilpatrick Stockton LLP

(57) ABSTRACT

Provided is a direct-current converter which can reduce power consumption at light load by reducing switching losses of a main switch. The direct-current converter is provided with: a first serial circuit which is connected to both ends of a direct current power supply Vdc1 and in which a primary winding P of a transformer T and a main switch Q1 are serially connected to each other; a second serial circuit which is connected both ends of the primary winding P of the transformer T and in which an auxiliary switch Q2 and a snubber capacitor C2 are serially connected to each other; rectifying/smoothing circuits D5, D6, L1 and C5 which rectify and smooth a voltage generated in a secondary winding S of the transformer T by energy supplied from the primary winding P of the transformer T when the main switch Q1 is turned on; and a control circuit 10 which turns on/off the main switch Q1 and the auxiliary switch Q2 alternately using a signal with predetermined switching frequency. The control circuit 10 reduces the switching frequency during light load.

13 Claims, 10 Drawing Sheets

U.S. PATENT DOCUMENTS 6,466,462 B2 * 10/2002 Nishiyama et al. ...... 363/21.11
6,856,522 B1 * 2/2005 Wittenbreder, Jr. ...... 363/21.01

FOREIGN PATENT DOCUMENTS

| JP | 11-98831 A | 4/1999 |
| JP | 2000-92829 A | 3/2000 |
| JP | 2001-314079 A | 11/2001 |
| JP | 2002-199719 A | 7/2002 |
| JP | 2003-143851 A | 5/2003 |

OTHER PUBLICATIONS

Kazuo Shimizu, "Kosoku Suicching Regyureta (High-Speed Switching Regulator)", p. 30, Fig. 2.5, Sogo Denshi Syuppan, 1981.

* cited by examiner

DIRECT-CURRENT CONVERTER HAVING ACTIVE CLAMP CIRCUIT

TECHNICAL FIELD

The present invention relates to a direct-current converter with high-efficiency and low-noise.

BACKGROUND ART

FIG. 1 shows a circuit diagram of a conventional direct-current converter of this kind (see Harada, Kosuke. Suicchingu Dengen Handobukku (Switching Power supply Handbook), Chapter 2 Suicchingu Dengen no Kihon Kairo to Sekkei Ensyu (Basic Circuits and Design Practice for Switching Power Supply), p 27, FIG. 2.2, Nikkan Kogyo Shinbun Ltd., and Shimizu, Kazuo. Kosoku Suicching Regyureta (High-Speed Switching Regulator), 2.2.1 Tareigata Konbata (Separately Excited Converter), p 30, FIG. 2.5, Sogo Denshi Syuppan). In the direct-current converter shown in FIG. 1, a main switch Q1, including MOSFET or the like, is connected to a direct-current power supply Vdc1 through a primary winding P (winding number: n1) of a transformer T. A parallel circuit including a resistor R2 and a snubber capacitor C2, and a diode D2 connected in series to this parallel circuit are connected to both ends of the primary winding P, respectively. Not only a diode D1 but also a serial circuit including a resistor R1 and a capacitor C1 are connected to both ends of the main switch Q1. The main switch Q1 is turned on/off by PWM control of a control circuit 100.

The primary winding P of the transformer T and a secondary winding S of the same are wound so that common mode voltages are mutually generated. A rectifying/smoothing circuit, including diodes D5 and D6, a reactor L1 and a capacitor C5, is connected to the secondary winding S (winding number: n2) of the transformer T. This rectifying/smoothing circuit rectifies and smoothes a voltage induced by the secondary winding S of the transformer T (an on/off controlled pulse voltage) and produces a direct-current output to a load RL.

The control circuit 100 has a non-illustrated operational amplifier and photocoupler. The operational amplifier compares an output voltage from the load RL to a reference voltage and, where the output voltage from the load RL is the reference voltage or larger, controls so that a turning-on pulse width applied to the main switch Q1 becomes narrower. In other words, where an output voltage from the load RL is the reference voltage or larger, the turning-on pulse width is narrowed, thus controlling output voltages so that they become constant.

Next, operations of the direct-current converter having the above-mentioned construction are described with reference to the timing chart shown in FIG. 2. FIG. 2 shows an operating waveform during light load, depicting a voltage Q1$v$ between both ends of the main switch Q1, a current Q1$i$ flowing through the main switch Q1, and a gate signal Q1$g$ performing the on/off control of the main switch Q1.

First of all, once the main switch Q1 is turned on at time t31, the current Q1$i$ flows through the main switch Q1, performing a circuit in that the current flows through Vdc1, P, Q1, and back through Vdc1. This current Q1$i$ increases linearly until time t32 as time elapses. Further, between time t31 and t32, the main switch Q1 side of the primary winding P becomes the negative side, and, since the primary winding P and the secondary winding S are in the common mode, the anode side of the diode D5 becomes the positive side. Therefore, a current flows through S, D5, L1, C5 and back through S, transmitting energy to the secondary winding side.

Next, once the main switch Q1 is turned off by the gate signal Q1$g$ at time t32, the capacitor C1 is charged with exciting energy induced by the primary winding P of the transformer T and exciting energy of a leakage inductor Lg (an inductance not coupled to the secondary winding S). When a voltage of the capacitor C1 and that of the snubber capacitor C2 are equal, the diode D2 is turned on, and the energy thereof is stored in the snubber capacitor C2. The energy stored in the snubber capacitor C2 is lost by the reactor R2.

Moreover, since a current flowing through the reactor L1 is cut off during light load, once the energy stored in the primary winding P of the transformer T is released completely, the inductance of the primary winding P of the transformer T resonates with the capacitor C1. Hence, the voltage Q1$v$ of the main switch Q1 oscillates as shown in FIG. 2.

DISCLOSURE OF THE INVENTION

However, in the direct-current converter shown in FIG. 1, there has been a problem in that the main switch needs to be turned on at a voltage valley (bottom) of the main switch in order to operate the main switch with a small switching loss during light load, and such enabling control circuit is complicated.

It is thus an object of the present invention to provide a direct-current converter which can reduce power consumption during light load by reducing switching losses of a main switch.

In order to solve the abovementioned problem, the present invention is constructed as follows. An invention of claim 1 is a direct-current converter comprising: a first serial circuit which is connected to both ends of a direct-current power supply and in which a primary winding of a transformer and a main switch are serially connected to each other; a second serial circuit which is connected to both ends of the main switch or both ends of the primary winding of the transformer and in which an auxiliary switch and a capacitor are serially connected to each other; a rectifying/smoothing circuit which rectifies and smoothes a voltage generated in a secondary winding of the transformer by energy supplied from the primary winding of the transformer when the main switch is turned on, the voltage being rectified and smoothed using a rectifying device and a smoothing device; and a control circuit which turns on/off the main switch and the auxiliary switch alternately using a signal with predetermined switching frequency, wherein the control circuit reduces the switching frequency during light load.

An invention of claim 2 is the direct-current converter according to claim 1, wherein the control circuit includes bottom detection means configured to detect a minimum voltage of the main switch after the auxiliary switch is turned off; and control signal generation means configured to generate a control signal which turns on the main switch at time of the minimum voltage of the main switch based upon an output of the bottom detection means.

An invention of claim 3 is the direct-current converter according to claim 1 or 2, wherein the control circuit, during light load, also leads to a burst mode where the switching frequency is further reduced.

An invention of claim 4 is the direct-current converter according to claim 2, wherein the control circuit includes: error voltage generation means configured to generate an error voltage signal based upon an error between an output voltage from the smoothing device and a reference voltage; frequency control means configured to generate a frequency control signal which reduces the switching frequency in accordance with a value of the error voltage signal when a value of the error voltage signal generated by the error voltage generation means reaches a first threshold; and pulse width control means configured to control a pulse width in accordance with the output voltage and for generating a pulse signal includes the switching frequency reduced in accordance with the frequency control signal generated by the frequency control means, wherein the control signal generation means generates the control signal based upon the pulse signal from the pulse width control means and an output from the bottom detection means.

An invention of claim 5 is the direct-current converter according to claim 4, wherein the frequency control means leads to a burst mode where the switching frequency is further reduced when a value of the error voltage signal generated by the error voltage generation means reaches a second threshold smaller than the first threshold.

An invention of claim 6 is the direct-current converter according to any one of claims 1 to 5, comprising: a reactor connected between the primary winding of the transformer and the main switch; and an auxiliary transformer which is serially connected to the transformer and causes a flux of energy, that is stored in the reactor when the main switch is turned on, towards the secondary winding side when the mains switch is turned off.

An invention of claim 7 is the direct-current converter according to claim 6, wherein the reactor includes a leakage inductor between a primary winding and the secondary winding of the transformer that are wound around a core of the transformer to be loosely coupled to each other, and the primary winding of the transformer and the second winding of the auxiliary transformer are wound around the core of the transformer to be closely coupled to each other.

BEST MODE FOR CARRYING OUT THE INVENTION

Embodiments of a direct-current converter according to the present invention are detailed below with reference to the drawings. The direct-current converter according to the embodiments uses a forward control scheme where energy is supplied from the primary side of a transformer to the secondary winding side of the same when a main switch is turned on, and is characterized in that an active clump circuit including an auxiliary switch and a snubber capacitor is provided and switching frequency of a main switch is lowered during light load, thus reducing switching losses of the main switch and reducing power consumed during light load. The direct-current converter is also characterized in that a minimum voltage (bottom) of the main switch is detected after the auxiliary switch is turned off, and the main switch is turned on at the bottom voltage thereby switching losses are reduced.

First Embodiment

Figure 3:
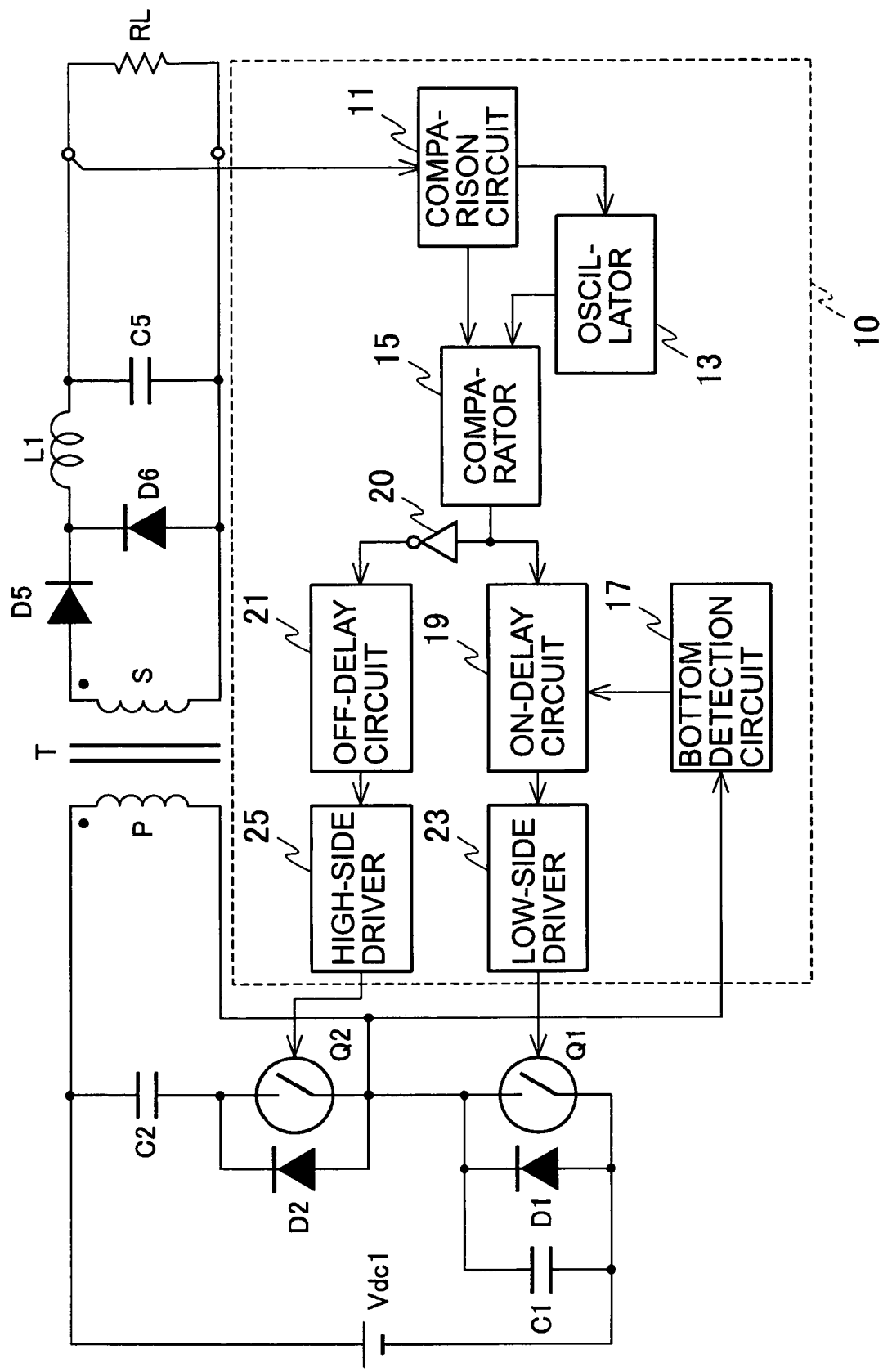
FIG. 3 is a circuit diagram showing a direct-current converter according to a first embodiment.

FIG. 3 is a circuit diagram of a direct-current converter according to the first embodiment. The direct-current converter shown in FIG. 3 uses a so-called active clamp scheme. In the converter, a main switch Q1, including MOSFET or the like, is connected to a direct-current power supply Vdc1 through a primary winding P (winding number: n1) of a transformer T, and a series circuit including an auxiliary switch Q2 made of MOSFET or the like and a snubber capacitor C2 is connected to both ends of the primary winding P. Note that the series circuit including the auxiliary switch Q2 and the snubber capacitor C2 may also be connected to both ends of the main switch Q1 instead of both ends of the primary winding P.

A parallel circuit including a diode D1 and a capacitor C1 is connected to both ends of the main switch Q1. A diode D2 is connected to both ends of the auxiliary switch Q2. The diode D1 may be a parasitic diode of the main switch Q1 and the diode D2 may be a parasitic diode of the auxiliary switch Q2. Further, the capacitor C1 may be a parasitic capacitor of the main switch Q1. The main switch Q1 and the auxiliary switch Q2 are turned on/off alternately by PWM control of a control circuit 10.

In addition, the primary winding P of the transformer T and a secondary winding S of the same are wound so that common mode voltages are mutually generated, and a rectifying/smoothing circuit including diodes D5 and D6, a reactor L1 and a capacitor C5 is connected to the secondary winding S (winding number: n2) of the transformer T. The rectifying/smoothing circuit rectifies and smoothes a voltage induced by the secondary winding of the transformer T (an on/off controlled pulse voltage) and produces a direct-current output to a load RL.

Based upon the output voltage from the load RL, the control circuit 10 generates a control signal including pulses for performing on/off control of the main switch Q1 and controls a duty ratio of the control signal so that the output voltage becomes a predetermined voltage.

Figure 4:
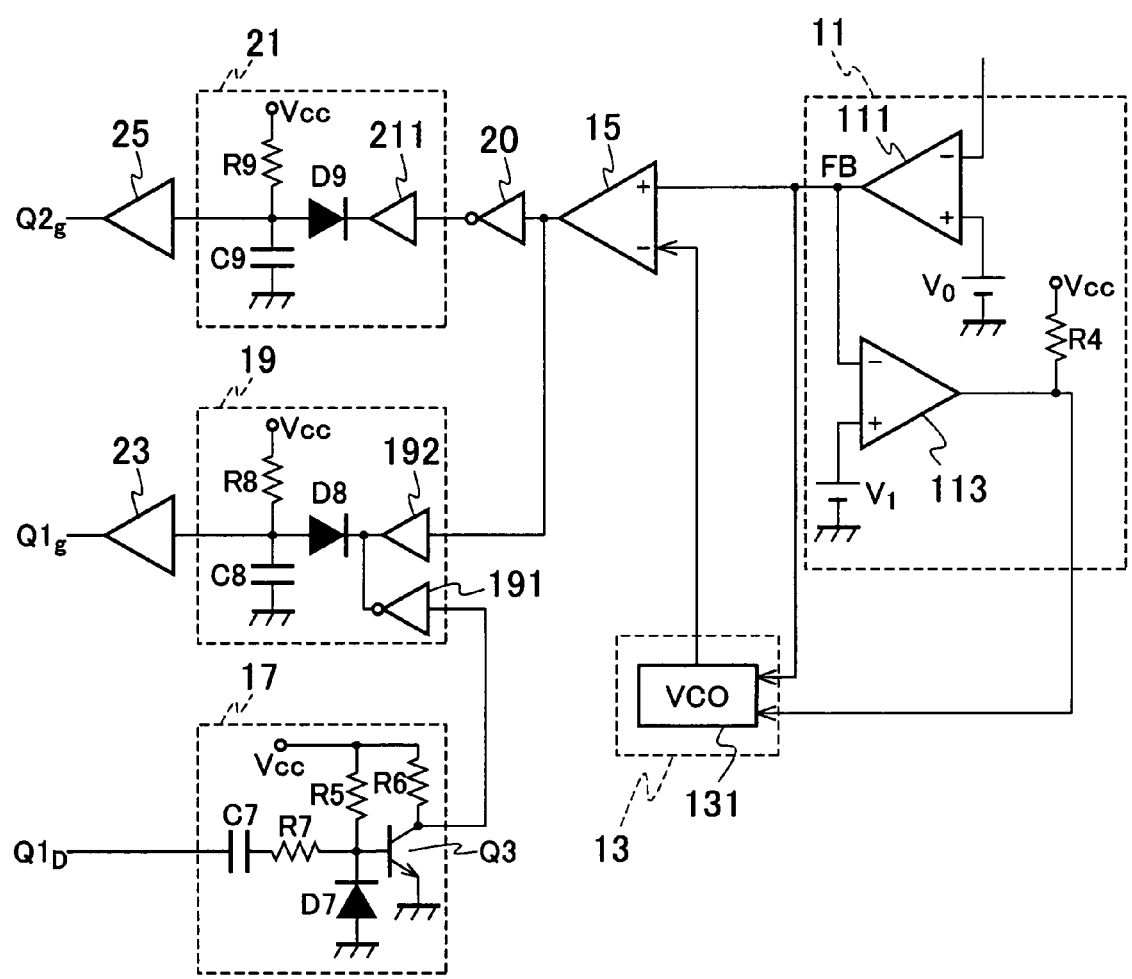
FIG. 4 is a specific circuit diagram of a control circuit provided in the direct-current converter according to the first embodiment.

The control circuit 10 is provided with a comparison circuit 11, an oscillator 13, a comparator 15, a bottom detection circuit 17, an on-delay circuit 19, an inverter 20, an off-delay circuit 21, a low-side driver 23, and a high-side driver 25. FIG. 4 shows a specific circuit diagram of the control circuit. Detailed construction of the control circuit is described later.

The comparison circuit 11 (which corresponds to error voltage generation means of the present invention) generates an error voltage signal based upon an error between a voltage of the capacitor C5 and a reference voltage and outputs this error voltage signal to the comparator 15 as a feedback signal FB. Where the feedback signal FB is a first threshold or smaller, the comparison circuit 11 also determines that a load is light and outputs, for example, a H level to the oscillator 13.

Where the feedback signal FB is the first threshold or smaller, that is, under the condition of light load, the oscillator 13 (which corresponds to frequency control means of the present invention) generates a triangle wave signal (which corresponds to a frequency control signal of the present invention) lowering switching frequency depending on a voltage value of the error voltage signal from the comparison circuit 11.

The comparator 15 (which corresponds to pulse width control means of the present invention) receives the triangle wave signal from the oscillator 13 and the feedback signal FB from the comparison circuit 11 as inputs, and generates a pulse signal which turns on when the value of the feedback signal FB is the value of the triangle wave signal or larger and turns off when the value of the feedback signal FB is smaller than the value of the triangle wave signal. The comparator 15 then outputs the pulse signal to the on-delay circuit 19 and the inverter 20.

The bottom detection circuit 17 detects a minimum voltage (hereinafter referred to as a bottom detection signal) of the main switch Q1 after the auxiliary switch Q2 is turned off. Based upon the bottom detection signal from the bottom detection circuit 17 and the pulse signal from the comparator 15, the on-delay circuit 19 generates an on-delay signal for turning on the main switch Q1 at the time of the minimum voltage of the main switch Q1. The low-side driver 23 applies the on-delay signal from the on-delay circuit 19 to the gate of the main switch Q1, thus driving the main switch Q1.

The inverter 20 inverses the pulse signal from the comparator 15 and outputs the inverted pulse signal to the off-delay circuit 21. The off-delay circuit 21 generates an off-delay signal by delaying the pulse signal inverted by the inverter 20 by a predetermined period and then outputs the off-delay signal to the high-side driver 25. The high-side driver 25 applies the off-delay signal from the off-delay circuit 21 to the gate of the auxiliary switch Q2, thus driving the auxiliary switch Q2.

Figure 9:
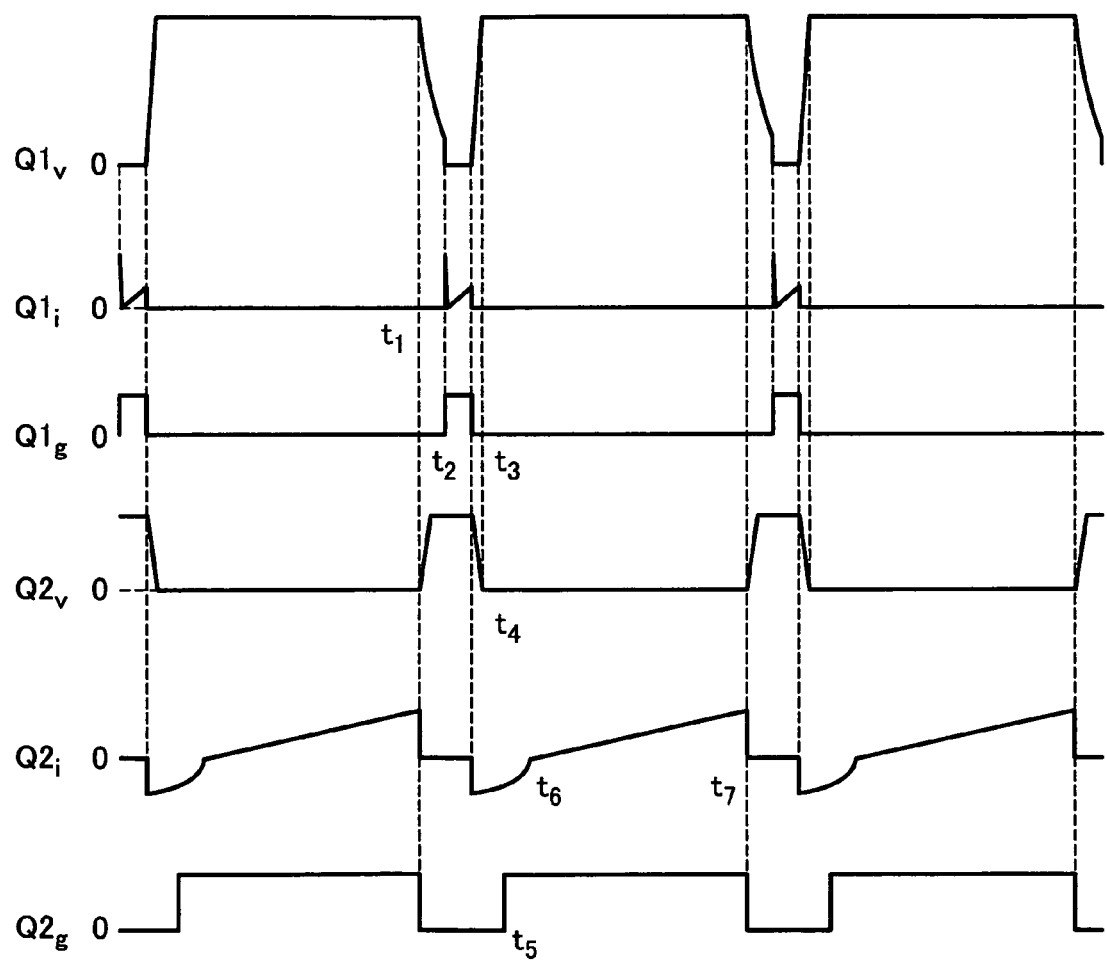
FIG. 9 is a timing chart of a signal during light load in each part of the direct-current converter according to the first embodiment.

Next, operations of the direct-current converter according to the first embodiment constructed as above are described with reference to the timing chart shown in FIG. 9. Note that FIG. 9 shows operating waveforms during light load and depicts a voltage Q1$v$ between both ends of the main switch Q1, a current Q1$i$ flowing through the main switch Q1, a gate signal Q1$g$ for performing on/off control of the main switch Q1, a voltage Q2$v$ between both ends of the auxiliary switch Q2, a current Q2$i$ flowing through the auxiliary switch Q2, and a gate signal Q2$g$ for performing on/off control of the auxiliary switch Q2.

First of all, when the main switch Q1 is turned on by the gate signal Q1$g$ at time t2, the current Q1$i$ flows through the main switch Q1, performing a circuit in that the current flows through Vdc1, P, Q1, and back through Vdc1. The current Q1$i$ increases linearly until time t3 as time elapses. Further, between time t2 and t3, the main switch Q1 side of the primary winding P becomes the negative side, and, since the primary winding P and the secondary winding S are in the common mode, the anode side of the diode D5 becomes the positive side. Therefore, a current flows through S, D5, L1, C5 and back through S, transmitting energy to the secondary winding side.

Next, once the main switch Q1 is turned off by the gate signal Q1$g$ at time t3, the capacitor C1 is charged with exciting energy induced by the primary winding P of the transformer T as well as exciting energy of a leakage inductor Lg.

Thereafter, when a voltage of the capacitor C1 and that of the snubber capacitor C2 are equal to each other, the diode D2 turns on, and its energy is stored in the snubber capacitor C2. In other words, a current flows through P, D2, C2 and back through P between time t3 and t6. While a current is flowing through the diode D2, the auxiliary switch Q2 is set to turn on at time t5 after time t4 at which the voltage Q2$v$ of the auxiliary switch Q2 drops to zero, thereby enabling zero-voltage switching of the auxiliary switch Q2.

Figure 1:
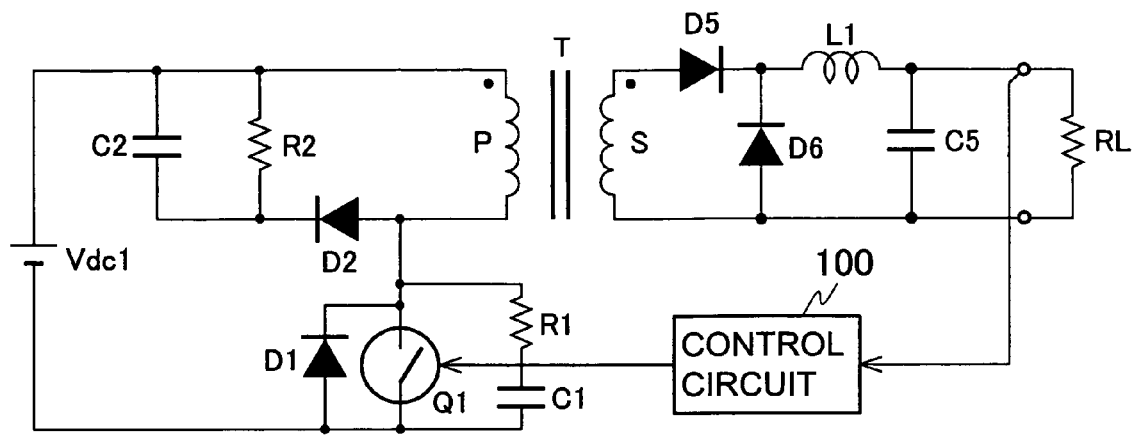
FIG. 1 is a circuit diagram showing a conventional direct-current converter.
Figure 2:
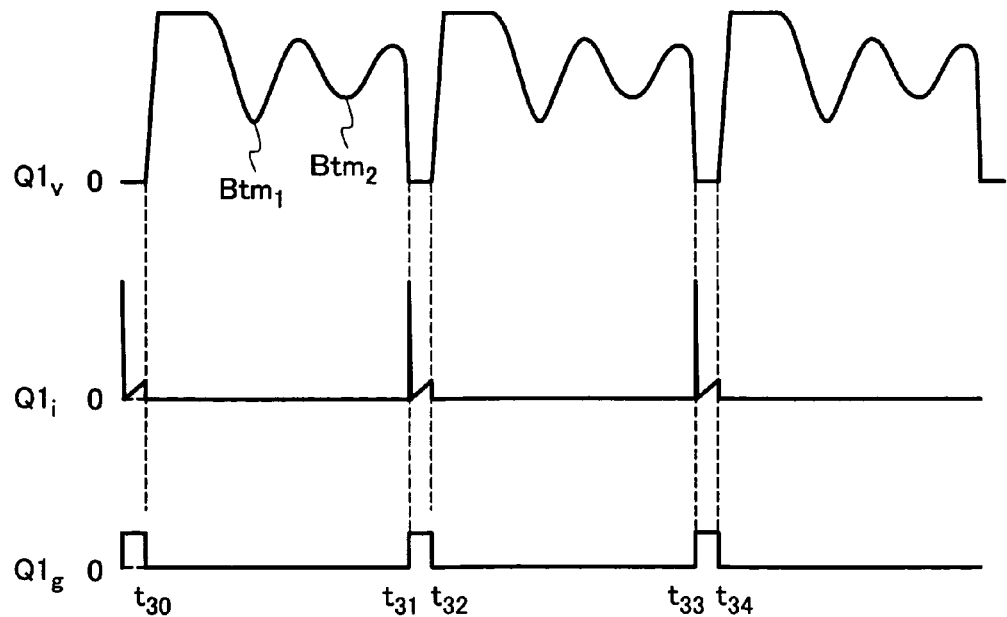
FIG. 2 is a timing chart of a signal at each part of the conventional direct-current converter during light load.

Even after the energy stored in the primary winding P of the transformer T moved to the snubber capacitor C2 (between time t6 and t7), the auxiliary switch Q2 is still on. Therefore, the current Q2$i$ flows through C2, Q2, P, and back through C2 and energy stored in the snubber capacitor C2 moves to the primary winding P of the transformer T. At this time, a voltage at the primary winding P of the transformer T becomes equal to that of the snubber capacitor C2, and the voltage of the primary winding P is held at the voltage of the snubber capacitor C2. This means that, since an active clamp circuit including the auxiliary switch Q2 and the snubber capacitor C2 is provided, such voltage oscillation of a voltage of the main switch Q1 as is stated in the description of the operation of the conventional direct-current converter shown in FIG. 1 does not occur.

Next, once the auxiliary switch Q2 is turned off at time t7 (same as time t1), the energy stored in the primary winding P allows a current to flow through P, Vdc1, C1 and back to P, and a voltage of the capacitor C1 (the main switch Q1) decreases. At this time, a minimum voltage of the main switch Q1, i.e. the bottom value is detected by the bottom detection circuit 17. At time t2 of the minimum voltage of the main switch Q1, the on-delay circuit 19 generates a gate signal Q1$g$ serving as an on-delay signal for turning on the main switch Q1, and the main switch Q1 is turned on by this gate signal Q1$g$. This means that the main switch Q1 is turned on at the bottom value of a voltage of the main switch Q1, thereby reducing switching losses of the main switch Q1 (bottom-voltage switching).

Figure 5:
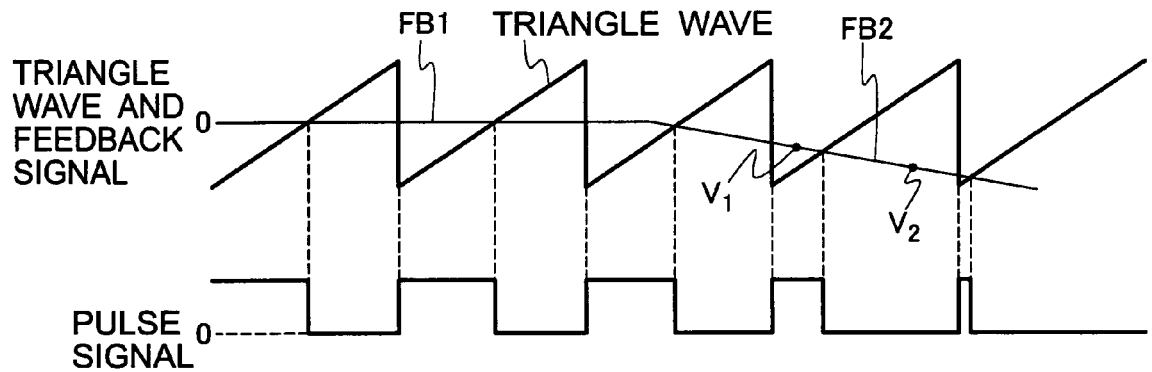
FIG. 5 is a view showing how duties of pulse signals are reduced when a feedback signal is lowered during light load.

Next, operations for reducing switching frequency during light load are described. First of all, the comparison circuit 11 generates an error voltage signal based upon an error between a voltage of the capacitor C5 and a reference voltage and outputs this error voltage signal to the comparator 15 as a feedback signal FB. Here, in the forward control system, the feedback signal falls from FB1 to FB2 during light load as shown in FIG. 5, and an on/off duty of a pulse signal becomes smaller. In addition, where the feedback signal FB is the first threshold V1 or smaller, the comparison circuit 11 determines that load is light and outputs, for example, a H level to the oscillator 13.

Figure 6:
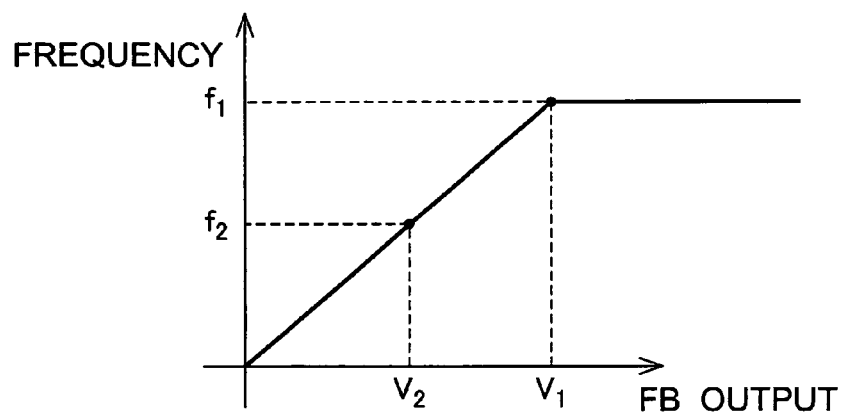
FIG. 6 is a view showing a characteristic of an oscillator which changes frequency depending on a voltage of the feedback signal.
Figure 8:
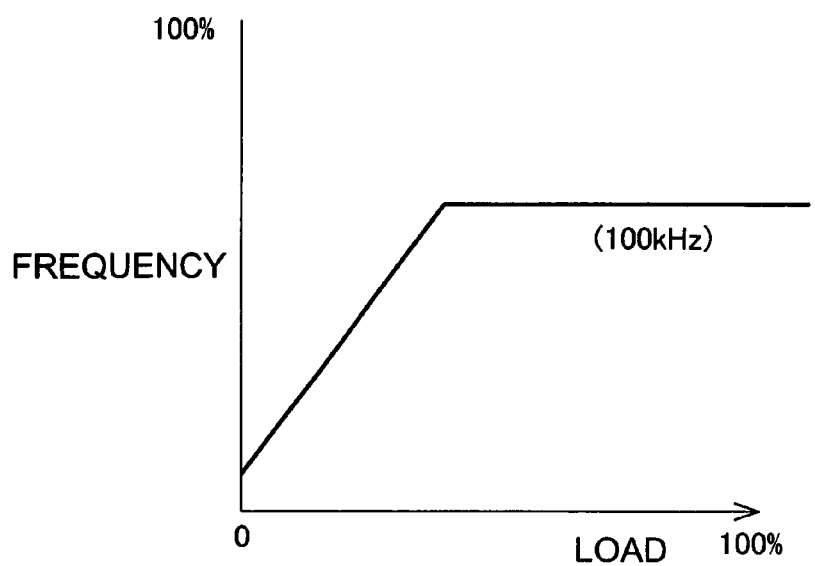
FIG. 8 is a view showing a characteristic of the oscillator which changes frequency depending on load rates at light weight.

Next, where the feedback signal FB is the first threshold or smaller, in other words, under a condition of light load, the oscillator 13 generates a triangle wave signal which is reduced switching frequency depending on a voltage value of the error voltage signal from the comparison circuit 11. For example, as shown in FIG. 6, as the voltage of the feedback signal FB drops from V1 to V2, switching frequency is reduced from f1 to f2. This corresponds to that, as shown in FIG. 8, switching frequency is, for example, 100 KHz under a normal condition and reduced in accordance with a load rate under the condition of light load.

Next, the comparator 15 receives the triangle wave signal from the oscillator 13 and the feedback signal FB from the comparison circuit 11 as inputs and generates a pulse signal which is turned on when the value of feedback signal FB is the value of the triangle wave signal or larger and turned off when the value of the feedback signal FB is smaller than the value of the triangle wave signal, as shown in FIG. 5. The comparator 15 then outputs the pulse signal to the on-delay circuit 19 and the inverter 20.

Figure 7:
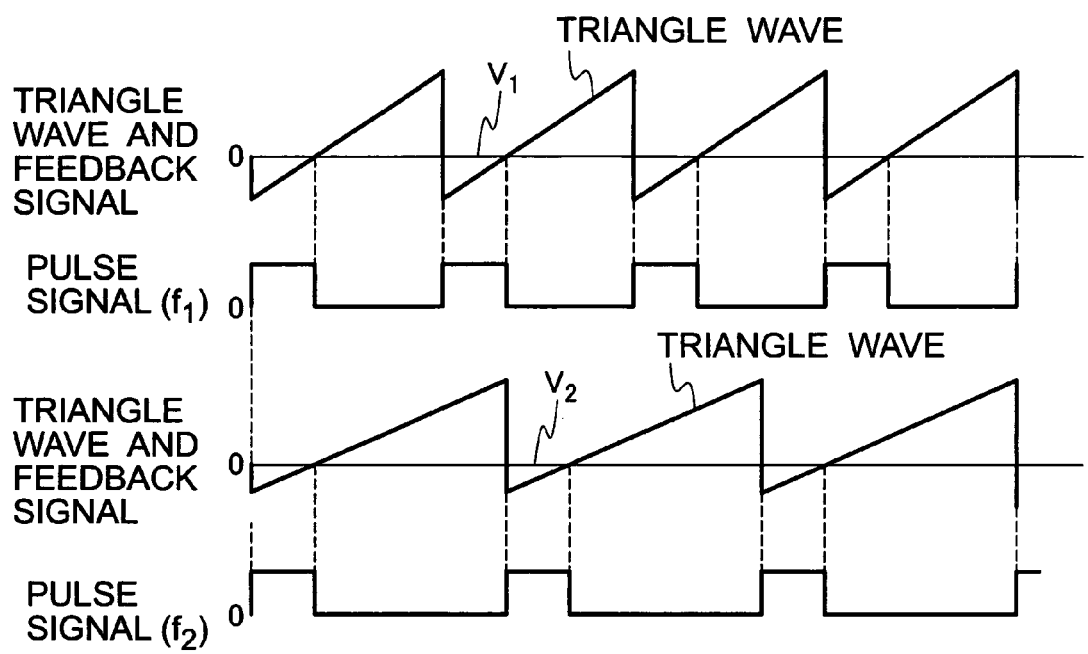
FIG. 7 is a timing chart of pulse signals the frequencies of which are lowered depending on load rates during light load.

As shown in FIG. 7, where the value of the feedback signal FB is equal to the value of V1, a pulse signal with frequency f1 is generated by the triangle wave signal with the frequency f1 corresponding to the voltage V1, and where the value of the feedback signal FB is the value of voltage V2, a pulse signal with frequency f2 is generated by the triangle signal with the frequency f2 corresponding to the voltage V2. In other words, switching frequency is lowered during light load, thus further reducing switching losses.

Figure 10:
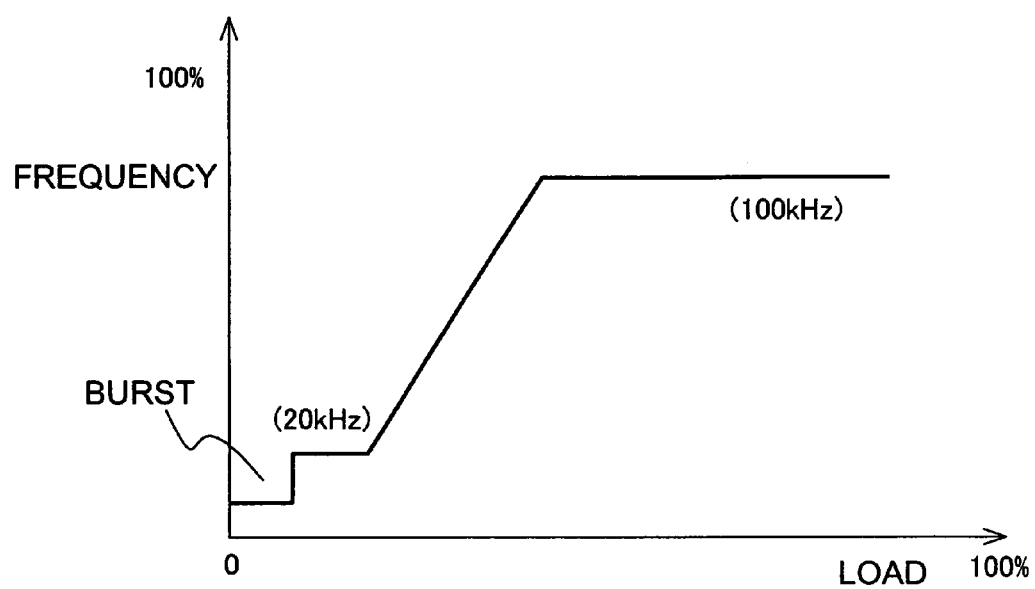
FIG. 10 is a view showing a second example of the oscillator which changes switching frequency depending on a load rate.
Figure 11:
FIG. 11 is a view showing bursts in the second example of the oscillator which changes in switching frequency depending on load rates.

As shown in FIG. 10, in the oscillator 13, minimum switching frequency is set slightly higher than audio frequency (for example, 20 KHz). If switching frequency drops to the minimum frequency corresponding to load rates, it is controlled by PWM modulation. A further drop of switching frequency leads to a burst mode. In the burst mode, for example, a burst of about 3 pulses at frequency of 50 to 100 Hz is inserted as shown in FIG. 10. With such operation, a beat of the transformer T at audio frequency can be prevented and switching losses can be further reduced during light load.

(Specific Circuit Structure)

FIG. 4 is a specific circuit diagram of the control circuit provided in the direct-current converter according to the first embodiment. The comparison circuit 11 shown in FIG. 4 includes an error amplifier 111 and a comparator 113. A voltage of the capacitor C5 is inputted to the negative terminal of the error amplifier 111 and a reference voltage V0 is inputted to the positive terminal of the same. Thereafter, the error amplifier 111 generates an error voltage signal based upon an error between the voltage of the capacitor C5 and the reference voltage V0 and outputs the error voltage signal to the comparator 15 as a feedback signal FB.

The feedback signal FB from the error amplifier 111 is inputted to the negative terminal of the comparator 113 and a reference voltage V1 is inputted to the positive terminal of the same. A resistor R4 is connected between the output terminal of the comparator 113 and a power supply Vcc. Where the feedback signal FB is the reference voltage V1 or smaller, the comparator 113 determines that load is light and outputs, for example, a H level to a VCO 131 included in the oscillator 13.

The VCO 131 is a voltage controlled oscillator which generates a signal with frequency corresponding to a voltage value. Where a H level is inputted from the comparator 131, in other words, where the feedback signal FB is the reference voltage V1 or lower, the VCO 131 generates a triangle wave signal which is reduced switching frequency in accordance with a voltage value of the error voltage signal from the error amplifier 111.

The feedback signal FB from the error amplifier 111 is inputted to the positive terminal of the comparator 15 and the triangle wave signal from the VCO 131 is inputted to the negative terminal of the same. Thereafter, the comparator 15 generates a pulse signal which is turned on when the value of the feedback signal FB is the value of the triangle wave signal or larger and turned off when the value of the feedback signal FB is smaller than the value of the triangle wave signal. The comparator 15 then outputs the pulse signal to the on-delay circuit 19 and the inverter 20.

In the bottom detection circuit 17, the cathode of a diode D7, one end of a resistor R5, and one end of a resistor R7 are connected to the base of a transistor Q3, and the emitter of the transistor Q3 is connected to the anode of the diode D7 and also grounded. One end of a resistor R6 is connected to the collector of the transistor Q3, and the other end of the resistor R5 and the other end of the resistor R6 are connected to a power supply Vcc. The other end of the resistor R7 is connected to the drain of the main switch Q1 through the capacitor C7. The collector of the transistor Q3 is connected to an inverter 191 in the on-delay circuit 19.

In the on-delay circuit 19, an output from the comparator 15 is connected to the cathode of a diode D8 through a buffer 192, and the anode of the diode D8 is connected to one end of a capacitor C8 and one end of a resistor R8. The other end of the capacitor C8 is grounded and the other end of the resistor R8 is connected to a power supply Vcc. The junction point of the resistor R8 and the capacitor C8 is connected to the gate of the main switch Q1 through the low-side driver 23. An output from the inverter 191 is connected to the cathode of the diode D8.

In the off-delay circuit 21, an output from the inverter 20 is connected to the cathode of a diode D9 through a buffer 211, and the anode of the diode D9 is connected to one end of a capacitor C9 and one end of a resistor R9. The other end of the resistor R9 is connected to the power supply Vcc and the other end of the capacitor C9 is grounded. The junction point of the resistor R9 ad the capacitor C9 is connected to the gate of the auxiliary switch Q2 through a high-side driver 25.

In this specific circuit, the error amplifier 111, the comparator 113, the VCO 131, and the comparator 15 are provided. Therefore, as shown in FIG. 7, when the value of the feedback signal FB is the value of the voltage V1, a pulse signal with frequency f1 is generated by a triangle wave signal with frequency f1 corresponding to V1, and, where the value of the feedback signal FB is the value of the voltage V2, a pulse signal with frequency f2 is generated by a triangle wave signal with frequency f2 corresponding to the voltage V2. In other words, switching frequency is lowered during light load, thus further reducing switching losses.

Next, once the voltage Q1v drops to a minimum value (bottom) at time t2 shown in FIG. 9, a current flows through Vdc1, P, C7, R7, Q3 or through Vcc, R5, Q3, and the transistor Q3 is turned on. Therefore, the minimum value (bottom) of the voltage Q1v is detected by the bottom detection circuit 17. At this time, a bottom detection signal at L level is outputted from the collector of the transistor Q3 to the inverter 191. This bottom detection signal is inverted by the inverter 191, and a H level is inputted to the cathode of the diode D8.

Accordingly, the diode D8 is turned off, and a current flows from the power supply Vcc to the capacitor C8 through the resistor R8, increasing the voltage of the capacitor C8. Hence, the voltage of the capacitor C8 is outputted to the low-side driver 23 and a gate signal Q1g is applied to the gate of the main switch Q1, turning on the main switch Q1. In other words, the main switch Q1 is turned on at a bottom voltage, whereby reducing switching losses of the main switch Q1 (bottom-voltage switching).

Second Embodiment

Next, a direct-current converter according to the second embodiment is described. The direct-current converter of the second embodiment is characterized in that a value of an inductance of a reactor serially connected to a primary winding of a transformer T is increased, and that an auxiliary transformer is provided which causes a reflux of energy, stored in the reactor when the main switch Q1 is turned on, towards the secondary winding side.

Figure 12:
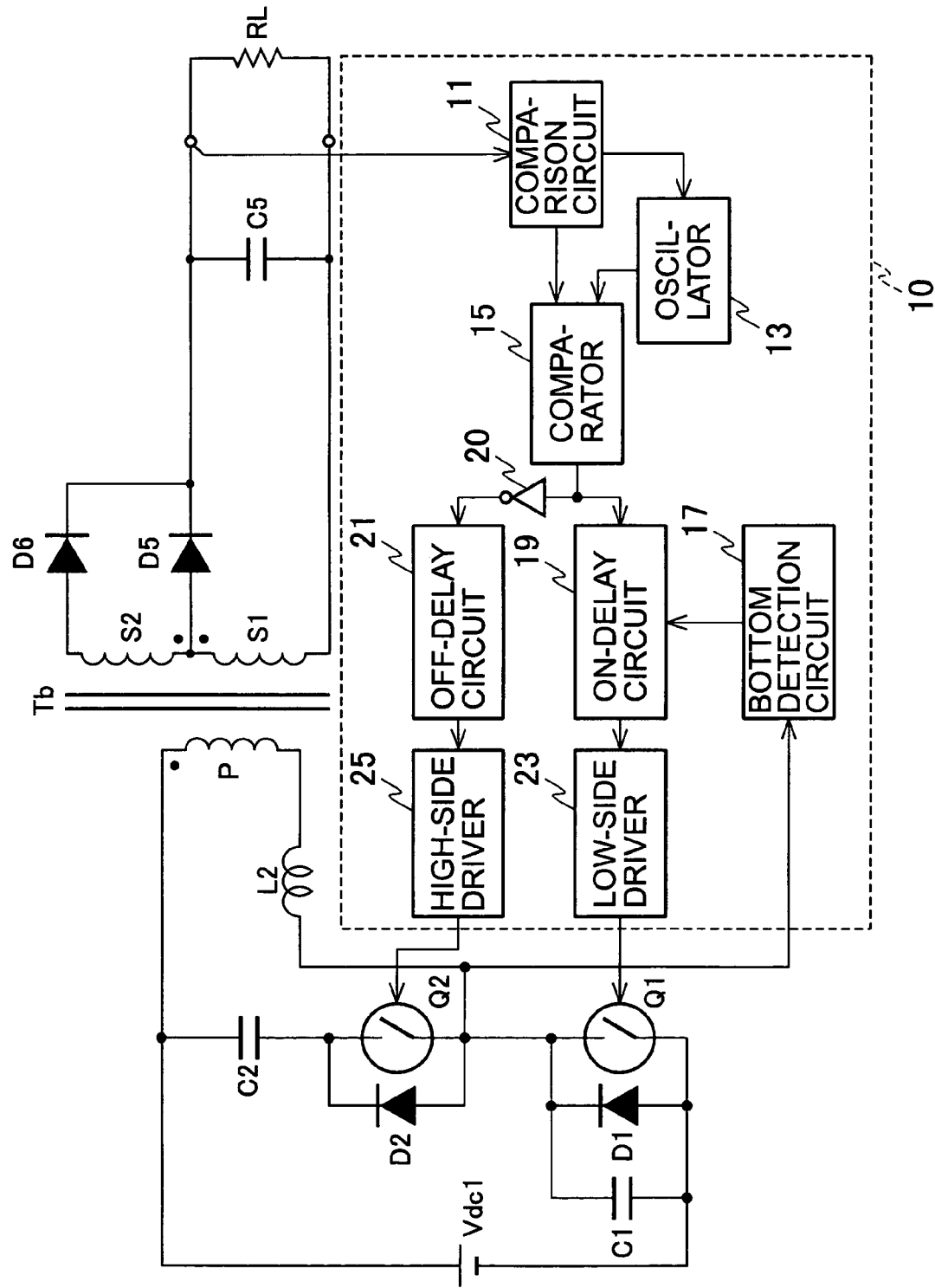
FIG. 12 is a circuit diagram showing a direct-current converter according to a second embodiment.

FIG. 12 is a circuit diagram showing the direct-current converter according to the second embodiment. The direct-current converter according to the second embodiment shown in FIG. 12 differs from the direct-current converter according to the first embodiment shown in FIG. 3 in the transformer T and peripheral circuits of the transformer T. Therefore, only these parts are described.

In this example, an auxiliary transformer is combined with a transformer Tb, and the primary winding P (winding number: n1, also serving as the primary winding of the auxiliary transformer Tb), the secondary winding S1 (winding number: n2) and the tertiary winding S2 (winding number: n3, corresponding to the second winding of the auxiliary transformer Tb) are wound around the transformer Tb. The primary winding P and the secondary winding S1 are wound to have the common mode, and the primary winding P and the tertiary winding S2 are wound to have an opposite mode. In other words, the secondary winding S1 of the transformer Tb is loosely coupled to the primary winding P, and a leakage inductor between the primary winding P and the secondary winding S1 substitutes for a reactor L2 connected serially to the transformer Tb. This causes a reflux of energy, stored in the reactor L2 when the switch Q1 is turned on, towards the secondary winding side when the switch Q1 is turned off.

One end (negative side) of the secondary winding S1 and one end (negative side) of the tertiary winding S2 are connected to each other, and the anode of the diode D5 is connected to their junction point. The anode of the diode D6 is connected to the other end (non-negative side) of the tertiary winding S2, and the cathode of the diode D5, the cathode of the diode D6 and one end of a capacitor C5 are connected to each other. The other side of the capacitor C5 is connected to the other end (non-negative side) of the secondary winding S1.

Figure 13:
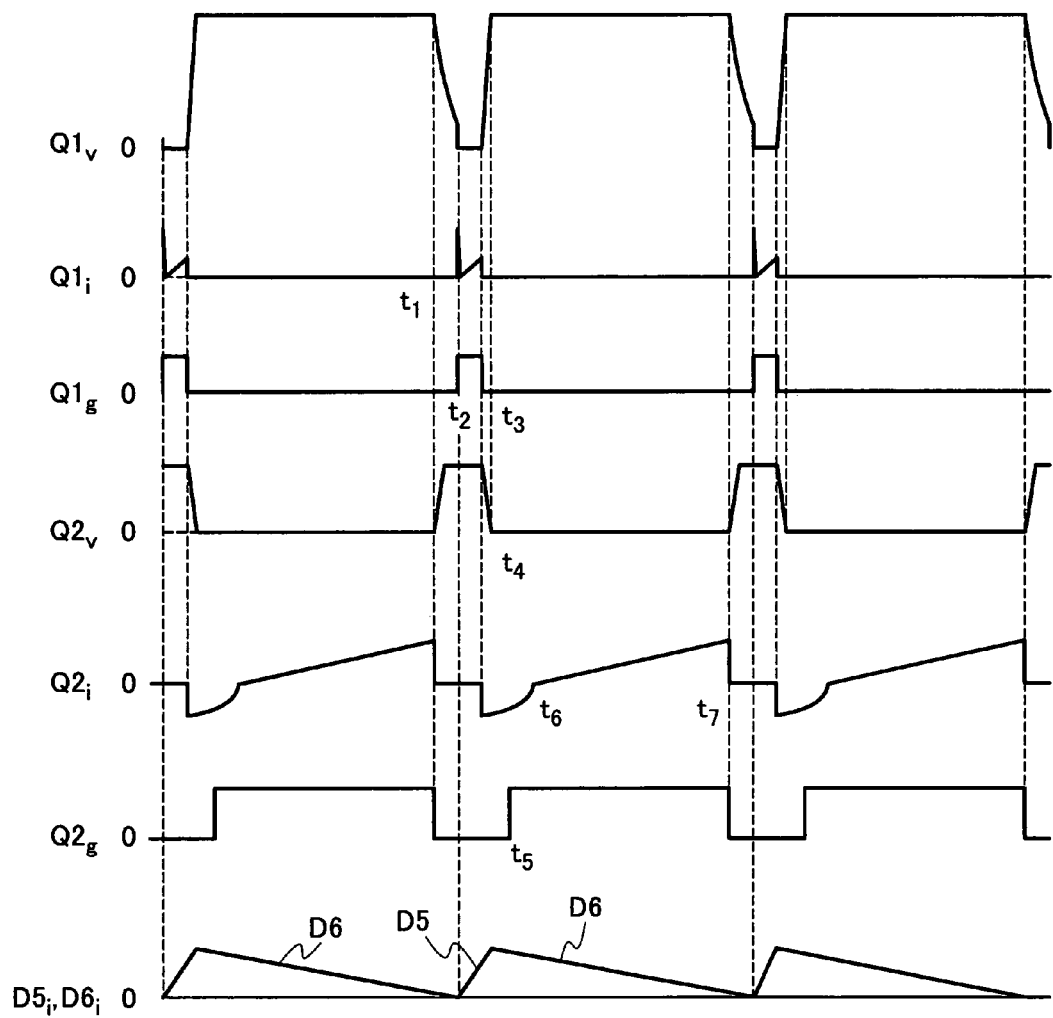
FIG. 13 is a timing chart of a signal during light load in each part of the direct-current converter in the second embodiment.

Next, operations of the direct-current converter according to the second embodiment constructed as above are described with reference to the timing chart shown in FIG. 13. Note that, in FIG. 13, currents D5$i$ and D6$i$ flowing through the diodes D5 and D6, respectively, are added to the timing chart in FIG. 9.

First of all, once the main switch Q1 is turned on at time t2, a current flows though Vdc1, P, L2, Q1, and back through Vdc1. At the same time, a voltage is also generated in the secondary winding S1 of the transformer Tb, and a current flows through S1, D5, C5, and back through S1. Therefore, as shown in FIG. 13, a current flowing through the diode D5 increases linearly between time t2 and t3.

Next, once the main switch Q1 is turned off at time t3, energy stored in the reactor L2 flows back to the secondary winding side. This means that, since a voltage is induced in the tertiary winding S2 on the secondary winding side, a current flows though S2, D6, C5, S1 and back through S2. Therefore, as shown in FIG. 13, a current flows through the diode D6 between time t3 and t7.

According to the direct-current converter of the second embodiment, the value of the inductance of the reactor L2 connected serially to the primary winding P of the transformer Tb is increased, and energy stored when the main switch Q1 is turned on is flown back to the secondary winding side, thus enhancing efficiency. In addition, provision of the diodes D5 and D6 enables a continuous flow of a current through the secondary winding side while the main switch Q1 is both turned on and off. Hence, a ripple current of the capacitor C5 is also reduced.

Figure 14:
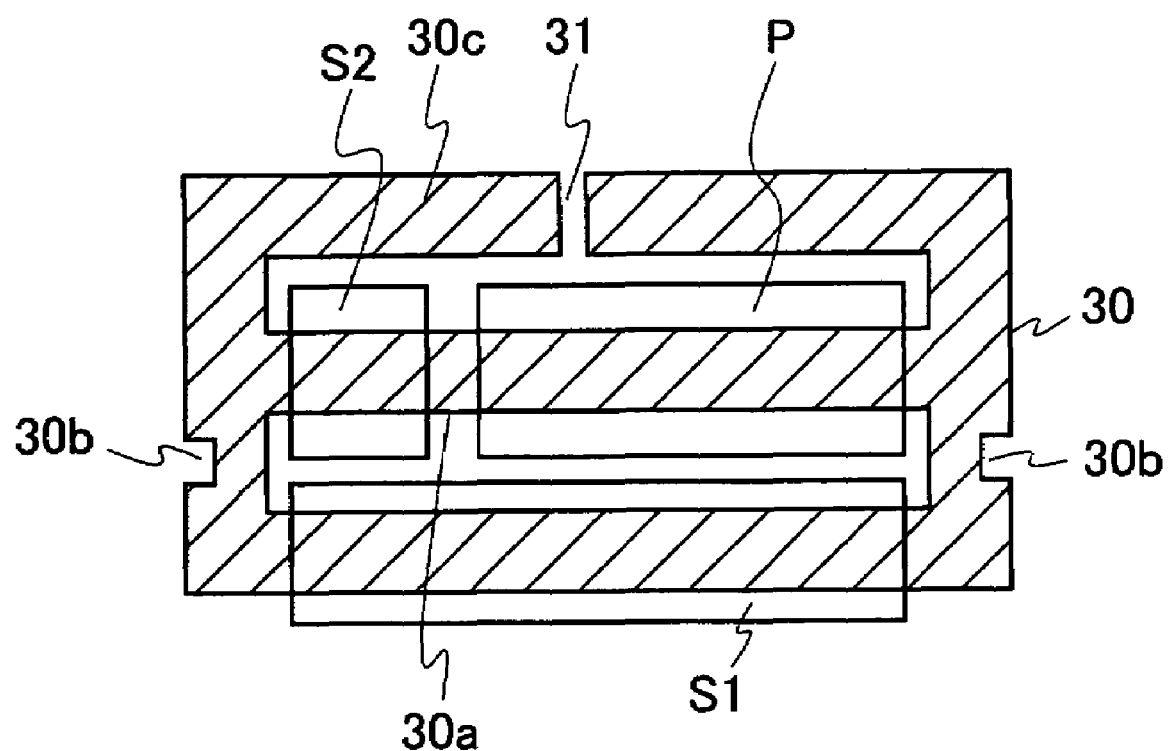
FIG. 14 is a structural view of a transformer provided in the direct-current converter according to the second embodiment.

Next, FIG. 14 shows a construction example of the transformer obtained by combining the auxiliary transformer with the transformer Tb. The transformer depicted in FIG. 14 includes a core 30 having a shape of a rectangular with a central bar." The primary winding P and the tertiary winding S2 are wound in proximity to each other around a core portion 30$a$ of the core 30. This allows the primary and tertiary windings to have a little leakage inductor therebetween. Further, a path core 30$c$ and a gap 31 are formed in the core 30, and the secondary winding S1 is wounded around a circumference core. In other words, the primary winding P and the secondary winding S1 are loosely coupled to each other by the path core 30$c$, thus increasing the leakage inductor. This leakage inductor substitutes for the reactor L2.

There are two recess portions 30$b$ formed on the circumference core and between the primary winding P and the secondary winding S1. The recess portions 30$b$ make some parts of a cross sectional area of a magnetic path in the circumference core smaller than the rest of the parts, and only these smaller parts are saturated, thereby reducing core losses.

As described so far, by devising of the core shape of the transformer T and the windings, the transformer Tb is combined on the single core 30 with the auxiliary transformer which causes a reflux of energy stored in the reactor L2 to the secondary winding side, and a path core 30$c$ is provided. Therefore, a large leakage inductor is obtained and the transformer is joined to the reactor, enabling a smaller and less expensive direct-current converter.

In the first and second embodiments, the comparison circuit 11 determines that load is light when the feedback signal FB is the first threshold or lower. However, in the forward control system, since an on/off duty of a pulse signal is reduced during light load, the comparison circuit 11 may also determine that load is light when, for example, a turning-on period of a pulse signal is a first set period or shorter. Alternatively, the comparison circuit 11 may determine that load is light when a voltage (output voltage) of the capacitor C5 shows an increase tendency.

According to the present invention, by reducing switching losses of a main switch, it is possible to provide a direct-current converter which can reduce power consumption during light load.

INDUSTRIAL APPLICABILITY

A direct-current converter of the present invention is applicable to a DC-DC conversion type power supply circuit and an AC-DC conversion type power supply circuit.

The invention claimed is:

1. A direct-current converter comprising:
   a first serial circuit which is connected to both ends of a direct-current power supply and in which a primary winding of a transformer and a main switch are serially connected to each other;
   a second serial circuit which is connected to both ends of the main switch or both ends of the primary winding of the transformer and in which an auxiliary switch and a capacitor are serially connected to each other;
   a rectifying/smoothing circuit configured to rectify and smooth a voltage generated in a secondary winding of the transformer by energy supplied from the primary winding of the transformer when the main switch is turned on, the voltage being rectified and smoothed using a rectifying device and a smoothing device; and
   a control circuit configured to turn on/off the main switch and the auxiliary switch alternately using a signal with predetermined switching frequency, the control circuit having error voltage generation means configured to generate an error voltage signal based upon an error between an output voltage from the smoothing device and a reference voltage and having frequency control means configured to generate a frequency control signal which reduces the switching frequency in accordance with a value of the error voltage signal when a value of the error voltage signal generated by the error voltage generation means reaches a first threshold indicative of light load condition.

2. The direct-current converter according to claim 1, wherein the control circuit includes:
   bottom detection means configured to detect a minimum voltage of the main switch after the auxiliary switch is turned off; and
   control signal generation means configured to generate a control signal which turns on the main switch at time of the minimum voltage of the main switch based upon an output of the bottom detection means.

3. The direct-current converter according to claim 1, wherein the control circuit, during further light load, leads to a burst mode where the switching frequency is further reduced.

4. The direct-current converter according to claim 2, wherein the control circuit, during further light load, leads to a burst mode where the switching frequency is further reduced.

5. A direct-current converter comprising:
   a first serial circuit which is connected to both ends of a direct-current power supply and in which a primary winding of a transformer and a main switch are serially connected to each other;
   a second serial circuit which is connected to both ends of the main switch or both ends of the primary winding of the transformer and in which an auxiliary switch and a capacitor are serially connected to each other;
   a rectifying/smoothing circuit configured to rectify and smooth a voltage generated in a secondary winding of the transformer by energy supplied from the primary winding of the transformer when the main switch is turned on, the voltage being rectified and smoothed using a rectifying device and a smoothing device; and
   a control circuit configured to turn on/off the main switch and the auxiliary switch alternately using a signal with predetermined switching frequency, the control circuit including:
   error-voltage generation means configured to generate an error voltage signal based upon an error between an output voltage from the smoothing device and a reference voltage;
   frequency control means configured to generate a frequency control signal which reduces the switching frequency in accordance with a value of the error voltage signal when a value of the error voltage signal generated by the error voltage generation means reaches a first threshold indicative of light load;
   pulse width control means configured to control a pulse width in accordance with the output voltage and generate a pulse signal which includes the switching frequency reduced in accordance with the frequency control signal generated by the frequency control means; and
   bottom detection means configured to detect a minimum voltage of the main switch after the auxiliary switch is turned off; and
   control signal generation means configured to generate a control signal which turns the main switch on at a time of the minimum voltage of the main switch according to the pulse signal from the pulse width control means and the output from the bottom detection means, wherein
   the control circuit reduces the switching frequency during the light load.

6. The direct-current converter according to claim 5, wherein the frequency control means leads to a burst mode where the switching frequency is further reduced when a value of the error voltage signal generated by the error voltage generation means reaches a second threshold smaller than the first threshold.

7. The direct-current converter according to claim 1, further comprising:
   a reactor connected between the primary winding of the transformer and the main switch; and
   an auxiliary transformer which is serially connected to the transformer and causes a flux of energy, that is stored in the reactor when the main switch is turned on, towards the secondary winding side when the mains switch is turned off.

8. The direct-current converter according to claim 2, further comprising:
   a reactor connected between the primary winding of the transformer and the main switch; and
   an auxiliary transformer which is serially connected to the transformer and causes a flux of energy, that is stored in the reactor when the main switch is turned on, towards the secondary winding side when the mains switch is turned off.

9. The direct-current converter according to claim 3, further comprising:
   a reactor connected between the primary winding of the transformer and the main switch; and
   an auxiliary transformer which is serially connected to the transformer and causes a flux of energy, that is stored in the reactor when the main switch is turned on, towards the secondary winding side when the mains switch is ruined off.

10. The direct-current converter according to claim 4, further comprising:

a reactor connected between the primary winding of the transformer and the main switch; and an auxiliary transformer which is serially connected to the transformer and causes a flux of energy, that is stored in the reactor when the main switch is turned on, towards the secondary winding side when the mains switch is turned off.

11. The direct-current converter according to claim 5, further comprising:

a reactor connected between the primary winding of the transformer and the main switch; and an auxiliary transformer which is serially connected to the transformer and causes a flux of energy, that is stored in the reactor when the main switch is turned on, towards the secondary winding side when the mains switch is turned off.

12. The direct-current converter according to claim 6, further comprising:

a reactor connected between the primary winding of the transformer and the main switch; and an auxiliary transformer which is serially connected to the transformer and causes a flux of energy, that is stored in the reactor when the main switch is turned on, towards the secondary winding side when the mains switch is turned off.

13. The direct-current converter according to claim 7, wherein the reactor includes a leakage inductor between a primary winding and a secondary winding that are wound around the transformer to be loosely coupled to each other, and the primary winding of the transformer and the second winding of the auxiliary transformer are wound around a core of the transformer to be closely coupled to each other.

* * * * *